No. 865,751. PATENTED SEPT. 10, 1907.
C. H. BACH.
VEHICLE BRAKE.
APPLICATION FILED JULY 17, 1906.
2 SHEETS—SHEET 1.
Fig. 1.
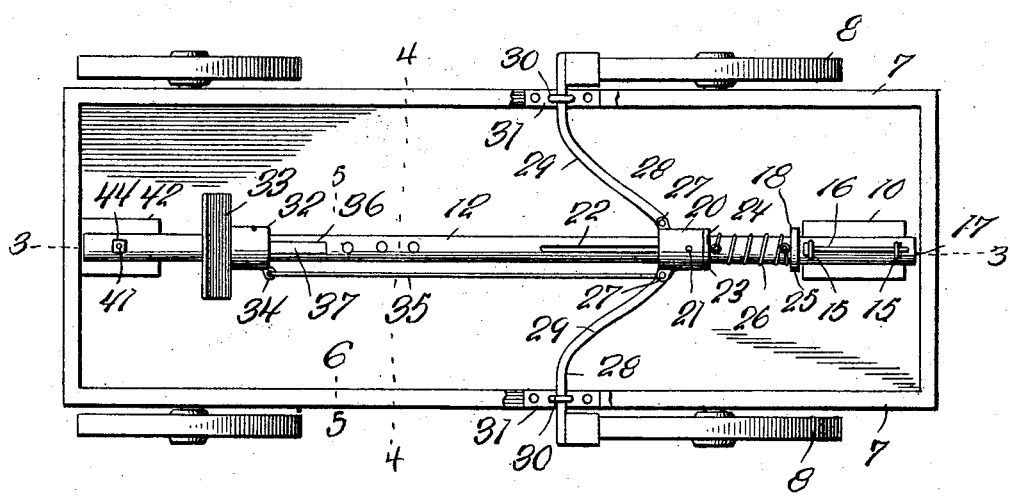
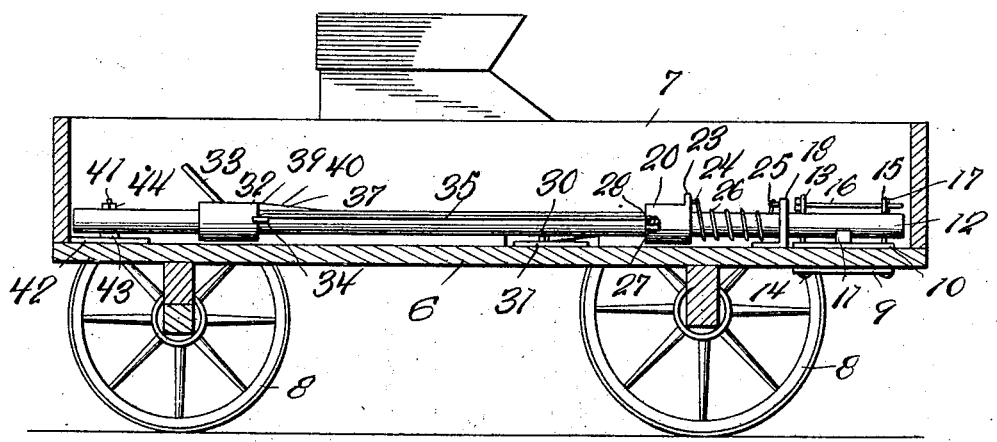
Fig. 2.
Witnesses
G. R. Thomas
F. B. MacNab
Inventor
C. H. Bach
By Chandler & Chandler
Attorneys No. 865,751. PATENTED SEPT. 10, 1907.
C. H. BACH.
VEHICLE BRAKE.
APPLICATION FILED JULY 17, 1906.

2 SHEETS—SHEET 2.

Witnesses
G. R. Thomas
F. B. MacNab

Inventor
C. H. Bach
By Chandler & Chandler
Attorneys

UNITED STATES PATENT OFFICE.

CHARLES H. BACH, OF BROOKS, MINNESOTA.

VEHICLE-BRAKE.

No. 865,751.    Specification of Letters Patent.    Patented Sept. 10, 1907.

Application filed July 17, 1906. Serial No. 326,599.

*To all whom it may concern:*

Be it known that I, CHARLES H. BACH, a citizen of the United States, residing at Brooks, in the county of Red Lake, State of Minnesota, have invented certain new and useful Improvements in Vehicle-Brakes; and I do hereby declare the following to be a full, clear, and exact description of the invention, such as will enable others skilled in the art to which it appertains to make and use the same.

This invention relates to brakes and has for its object to provide a brake which may be applied to any form of vehicle and which may be operated entirely by foot, thus leaving the hands of the occupants of the vehicle free to control the horse.

A further object of the invention is to provide a device of this nature which may be released and will resume its normal position after being so released, there being provided for this purpose a retracting spring which serves to rock the brake beams in position out of engagement with their respective wheels.

Figure 3:
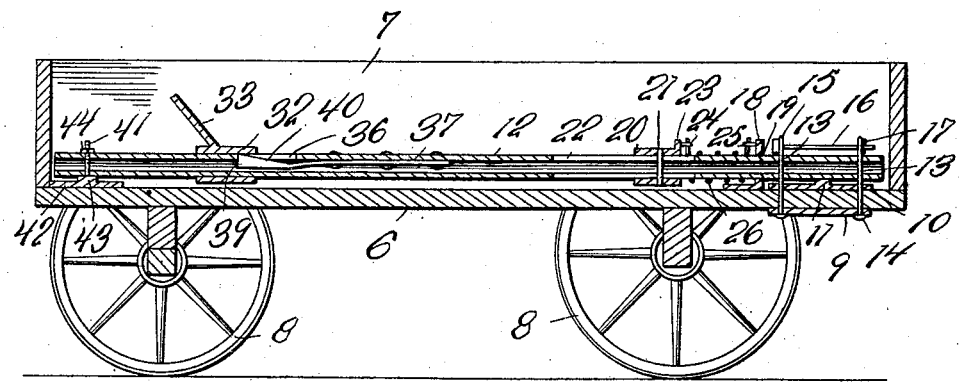
Figure 4:
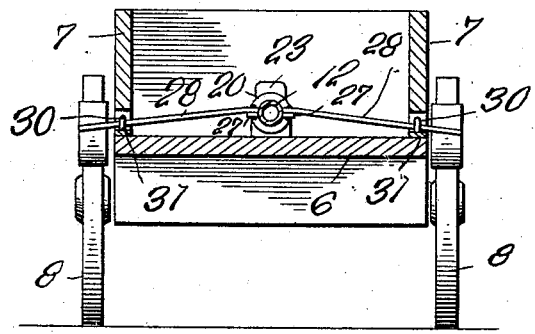
Figure 5:
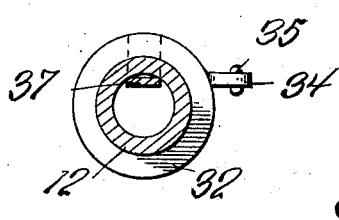

With the above and other objects in view, the invention consists in the construction and arrangement of parts shown in the accompanying drawings in which Figure 1 is a plan view partly in section, of a vehicle showing my brake applied thereto. Fig. 2 is a side elevation thereof in detail, one of the side parts of the vehicle being broken away, the parts of the device being shown in this figure in their proper relative position when the brake is applied. Fig. 3 is a detail, vertical, longitudinal, sectional view through the brake mechanism, the parts thereof being shown released. Fig. 4 is a detail, transverse, vertical, sectional view on the line 4—4 of Fig. 1, and Fig. 5 is a similar view on the line 5—5 of the same figure.

Referring more specifically to the drawings, the numeral 6 denotes the bed of a vehicle, 7 the side boards thereof and 8 the vehicle wheels.

A plate 9 is disposed upon the under side of the bed 6 of the vehicle at the rear end thereof and upon the upper side of the said bed and directly above the plate 9 is a plate 10. The plate 10 is provided intermediate its ends with an upstanding boss 11 upon which rests the rear end of a tube 12, there being bolts 13 engaged through alining openings formed in the ends of the plates 9 and 10, the bed of the vehicle, and the said ends of the tube. Each of the bolts 13 is provided at its lower end with a head 14 and at its upper end with an eye 15 and through the eyes of the bolts and above the tube 12 is engaged a pin 16 which has one of its ends apertured for engagement therethrough of a locking pin or key 17 which holds the bolt 16 in its place. A bracket 18 is mounted upon the bed of the wagon directly in advance of the forward end of the plate 10 and is provided with an opening 19 through which is engaged the rear end portion of the tube 12.

Slidably disposed upon the said tube is a sleeve 20 which is held against rotation upon the tube by means of a pin 21 which is engaged through the said sleeve and works in slots 22 formed through the said tube. The said sleeve is provided with an upstanding bracket 23 at its rear end and connected at one of its ends to an eye member 24 on the bracket 23 and at its opposite end to an eye member 25 formed upon the bracket 18, is a helical spring 26, the said spring being engaged upon the tube 12 as will be readily understood.

The function of the spring 26 is to hold the sleeve 20 at the limit of its rearward movement and to retract the same under conditions to be hereafter described. Formed upon the sleeve 20 are apertured lugs 27 which are located at the forward end of the sleeves and at diametrically opposite points thereon, and pivoted to the said lugs 27 are the inner ends of brake beams 28 which are curved forwardly and laterally as at 29 from the said pivotal point and extend through guide yokes 30 formed on plates 31 which are secured to the bed of the vehicle and beneath the corresponding side members thereof, the end edges of the side board being recessed for this purpose. The outer ends of the brake beams extend beyond the said guide yokes as will be readily understood and in position for engagement with the respective wheels 8 of the vehicle.

From the foregoing it will be observed that movement of the sleeve 20 forwardly upon the tube 12 will oscillate the brake beams 28 and cause them to engage their respective wheels and that, conversely, rearward movement of the sleeve will serve to move the beams out of engagement with the wheels.

In order that the sleeve may be thus moved, I have provided a foot actuated brake operating mechanism which will now be described. Slidably disposed up the tube 12 adjacent the forward end thereof is a sleeve 32 upon which is formed a foot rest 33 which is inclined upwardly as shown to permit the occupant of the vehicle obtaining a firm purchase thereon. An ear 34 is formed upon one side of the sleeve at the rear end thereof and connected at one of its ends with the said ear and at its opposite end to the pivoted bolt of one of the brake beams 28, is a brake rod 35 which serves as a means for imparting motion to the sleeve 20 when the sleeve 32 is moved or is reciprocated.

As a means for holding the sleeve 32 at the forward limit of its movement and hence holding the brake beams in operative position, the tube 12 is slotted adjacent its forward end as at 36 and riveted to the inner side of the tube is a leaf spring 37 which has a normal tendency to project through the said slot and formed upon the forward end of the said spring is a lug 38 having an abrupt face 39 and a beveled face 40.

It is obvious that when the sleeve 32 is moved to the proper point and in a forward direction, the spring will be permitted to exert its tension to move the lug in position to extend through the slot in the tube with its abrupt face 39 abutting the rear end of the said sleeve.

It is also obvious that when it is desired to release the brake mechanism, the lug may be depressed by the heel of the occupant of the vehicle to cause the same to sink in the tube and permit rearward movement of the said sleeve thereon, the tension of the spring 26 being such as to cause this movement.

The forward end of the tube 12 is supported and held in fixed position by means of a threaded stud 41 which is formed upon a plate 42, the latter being secured to the upper face of the bed in this section of the vehicle. The stud is headed at its junction with the plate 42 as indicated by the numeral 43 for the purpose of holding the said end of the tube in spaced relation with respect to the plate and the bed of the vehicle, and upon the threaded upper end of the stud is engaged a nut 44 which impinges against the said tube, it being understood that the stud extends through an opening formed thereon.

What is claimed is:—

1. A mechanism of the class described comprising a support, sleeves slidably disposed upon the support, a brake rod connecting said sleeves, brake beams connected with one of said sleeves, means connected with the said sleeve for holding the sleeves in position to render the brake inoperative, and means engaged with the other of the sleeves for holding the brake in operative position.

2. A mechanism of the class described comprising a support, sleeves slidably disposed upon the support, a brake rod connecting said sleeves, brake beams connected with one of said sleeves, means connected with said sleeve for holding the sleeves in position to render the brake inoperative, and a spring detent arranged for engagement with the other sleeve for holding the brake in operative position.

In testimony whereof, I affix my signature, in presence of two witnesses.

CHARLES H. BACH.

Witnesses:
W. B. CHESHIRE,
B. J. DUNN.